April 5, 1966  G. E. LEWIS  3,245,085
COUPLING
Filed Jan. 3, 1963
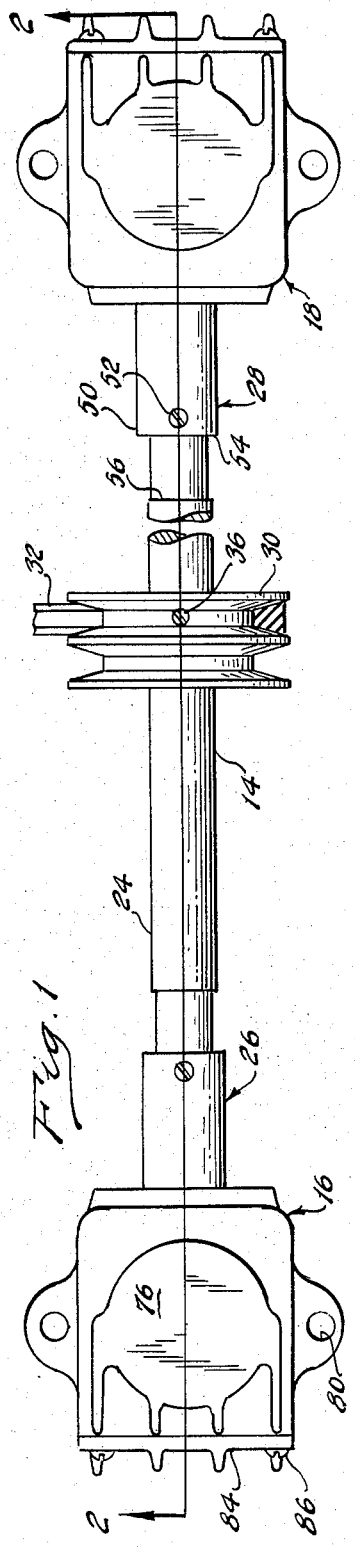
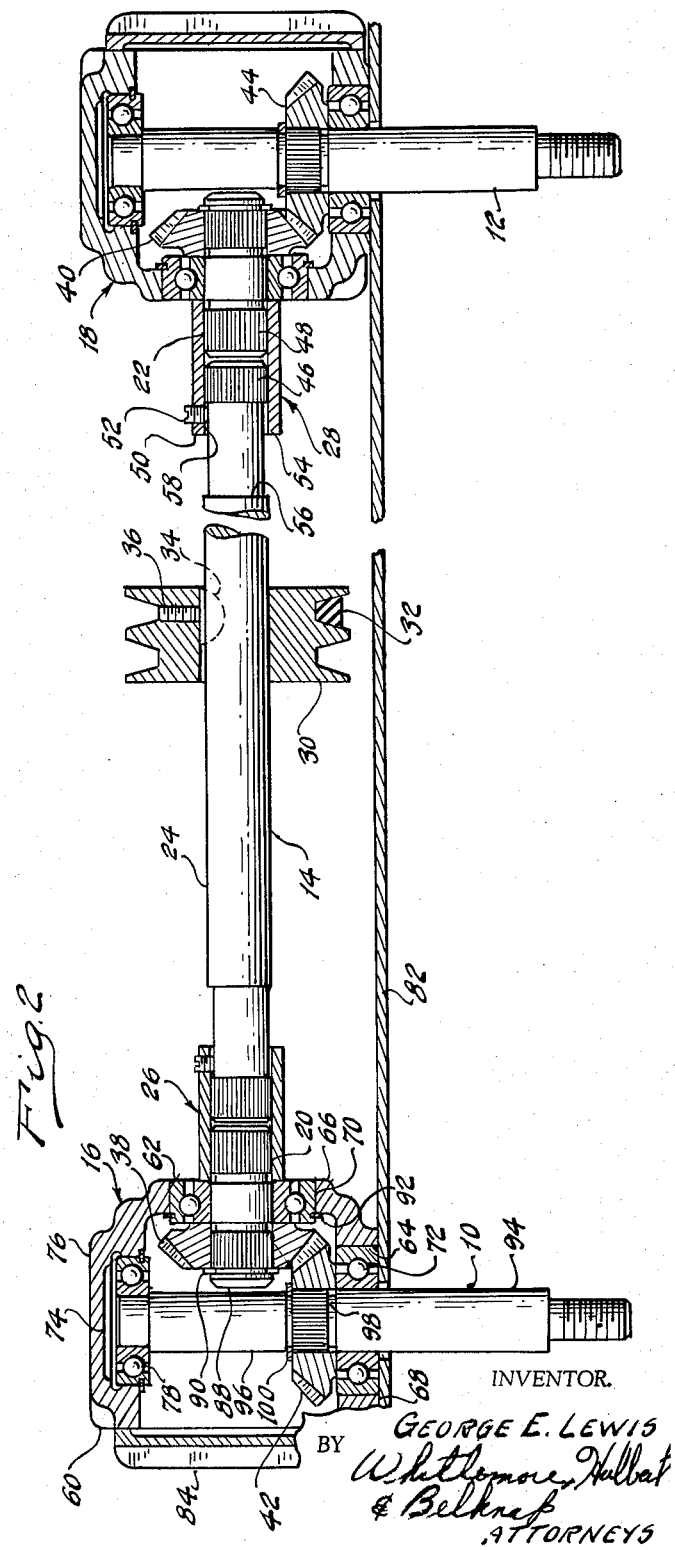
INVENTOR.
GEORGE E. LEWIS
BY Whitemore, Hulbut & Belknap
ATTORNEYS

United States Patent Office 3,245,085
Patented Apr. 5, 1966

3,245,085
COUPLING
George E. Lewis, Dunkirk, Ohio, assignor to Tecumseh Products Company, Tecumseh, Mich., a corporation of Michigan
Filed Jan. 3, 1963, Ser. No. 249,189
5 Claims. (Cl. 74—665)

The invention relates to coupling structure and refers more specifically to structure for driving a pair of spaced apart substantially parallel shafts in rotation including a driving shaft extending transversely of the driven parallel shafts having end sections and a removable center section and unique coupling means for coupling the center section to the end sections of the driving shaft and particularly compact easily assembled apparatus for rotatably mounting the driving and driven shafts and transferring rotational motion therebetween.

In apparatus, such as power lawnmowers and the like, it is often desirable to rotate a pair of substantially parallel shafts in synchronism. In the past such shafts have been rotated with an integral driving shaft extending between the driven shafts which driving shaft has been rotated by convenient belt or chain drives. In such structure bevel or worm gear arrangements have often been used to transfer rotary motion between the driving and driven shafts.

In such prior structures the changing of the driving chain or belt has in the past necessitated the complete removal of the driving shaft including disassembly of the driving connection thereof with the driven shafts. Such procedure has been relatively complicated and time consuming and therefore undesirable.

Further with prior constructions the driving connection between the driving shaft and driven shafts have often been complicated so that they have been expensive to produce and difficult even in initial assembly.

It is therefore a purpose of the present invention to provide apparatus for rotating a pair of spaced apart substantially parallel shafts comprising a driving shaft extending therebetween including separate end sections and a removable center section and simplified structure for rotatably supporting the driving and driven shafts and for transferring rotational motion therebetween.

Another object is to provide structure as set forth above including an improved coupling for permitting removal of the center section of the driving shaft without disengagement of the end sections thereof from the means rotatably supporting the driving shaft.

Another object is to provide structure as set forth above wherein adjacent end portions of the axially aligned center and end sections of the driving shaft are externally splined, sleeves are provided having complementary internal splines thereon extending over said adjacent end portions for preventing relative rotation between the center section and end sections of the driving shaft, and means are provided for releasably preventing relative axial movement between the driving shaft and sleeves.

Another object is to provide structure as set forth above wherein the structure for rotatably supporting the driving and driven shafts comprises a separate substantially rectangular housing rotatably supporting each end section of the driving shaft and the adjacent driven shaft and having an opening in adjacent side walls thereof, an interior recess in the side wall of each housing opposite one of said openings having a thrust bearing therein receiving the end of the respective driven shaft, a bearing within said one opening in which the respective driven shaft is rotatably mounted, a bevel gear splined to each driven shaft for rotation therewith and held between the bearing in the one opening and a snap ring secured to the respective driven shaft, a bearing positioned in the other opening in each housing limited in movement outwardly of the housing by means of a snap ring operable between the bearing and housing rotatably supporting the respective end section of the driving shaft, a bevel gear secured to the respective end section of the driving shaft within each housing for rotation therewith between the bearing and a snap ring secured to the respective end section of the driving shaft which bevel gear is in mesh with the bevel gear secured to the adjacent driven shaft.

Another object is to provide a coupling between axially stationary rotatably mounted end sections of a shaft and a removable center section thereof comprising externally splined adjacent end portions on the center section and end sections of the shaft, a complementarily internally splined sleeve positioned over the adjacent end portions of the center and end sections of the shaft for preventing relative rotation therebetween and for selective axial sliding movement relative thereto.

Another object is to provide improved structure for rotatably supporting the ends of a pair of substantially perpendicular shafts and transferring rotational motion therebetween.

Another object is to provide structure for rotating a pair of spaced apart substantially parallel shafts in synchronism including coupling structure which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is a plan view of coupling structure for rotating a pair of substantially parallel shafts constructed in accordance with the invention.

FIGURE 2 is a section view of the structure illustrated in FIGURE 1 taken substantially on the line 2—2 in FIGURE 1.

With particular reference to the figures of the drawing one embodiment of the present invention will now be considered in detail.

In accordance with the invention the substantially parallel shafts 10 and 12 are driven in rotation from the driving shaft 14 through the structure 16 and 18 at the opposite ends of the driving shaft 14 for rotatably supporting the end section 20 of the driving shaft 14 and the driven shaft 10, and the end section 22 of the driving shaft 14 and the driven shaft 12 and for transferring rotational motion therebetween respectively. Further the driving shaft 14 is provided with a removable center section 24 secured to the end sections 20 and 22 by the coupling structures 26 and 28 respectively.

In operation the central section 24 of the driving shaft 14 is rotated by means of the pulley wheel 30 and the driving belt 32 therefor. The pulley wheel 30 is keyed to the central section 24 to the shaft 14 by means of the key 34 held in position by the set screw 36.

The central section 24 of the driving shaft 14 in turn rotate the end sections 20 and 22 thereof through the coupling structures 26 and 28 respectively whereby the bevel gears 38 and 40 are rotated to rotate the bevel gears 42 and 44 respectively which are in mesh therewith and mounted against rotation on the driven shafts 10 and 12. The driven shafts 10 and 12 are thus caused to rotate in synchronism.

The coupling structures 26 and 28 are exactly the same. Therefore only coupling structure 28 will be considered in detail.

Coupling structure 28 includes the externally splined end portion 46 on the center section 24 of the driving shaft 14 and the adjacent similarly splined end portion 48 of the end section 22 of the driving shaft 14. The complementarily internally splined sleeve 50 is positioned over the end portions 46 and 48 of the center section 24 and the end section 22 of the driving shaft 14, as illustrated best in FIGURE 2. The set screw 52 is provided to releasably secure the sleeve 50 in a predetermined axial position on the driving shaft 24.

In operation the set screw 52 may be loosened and the sleeve 50 moved axially of the driving shaft 24 so that the end 54 thereof abuts the annular abutment 56 provided on the removable center section 24 of the driving shaft 14. After the corresponding procedure has been followed with respect to coupling structure 26, the center section 24 of driving shaft 14 may then be moved transversely with respect to the end section 48 to permit removal and replacement of the pulley wheel 30 or belt 32 without disturbing the rotational mounting of the end section 22 of the driving shaft 24 or the coupling between the end section 22 of the driving shaft 24 and the driven shaft 12.

In reverse, to couple the removable center section 24 to the end section 22, the center section 24 is aligned axially with the end section 22 and the sleeve 50 is moved toward the right in FIGURE 2 so that the internal splines 58 on the sleeve 50 mesh with the external splines on the end portion 48 of the end section 22 of the driving shaft 14 and the external splines on the end portion 46 of the center section 24 of the driving shaft 14. The set screw 52 is then tightened. The corresponding procedure is then repeated for coupling structure 26.

In detail the structures 16 and 18 for rotatably supporting the driving and driven shafts 14 and 10 and 12 and transferring rotational motion therebetween are exactly the same and therefore only the structure 16 for rotatably supporting and transferring rotational motion between the end section 20 of the driving shaft 14 and the driven shaft 10 will be considered in detail.

The structure 16 includes the substantially rectangular housing 60 having openings 62 and 64 in the adjacent sides 66 and 68 thereof in which the bearings 70 and 72 respectively are positioned. Housing 60 is further provided with a recess 74 in the side 76 thereof opposite the opening 64 in the side 68 for receiving the bearing 78.

Convenient means, such as bolts (not shown) extending through the openings 80 are provided for securing the housing 16 to a supporting member, such as a lawnmower frame 82, as illustrated in FIGURE 2. The side 84 of the housing may be removably secured thereto as by the screws 86 to facilitate assembly of the structure 16.

The end section 20 of the driving shaft 24 extends through the bearing 70 as illustrated in FIGURE 2. The bevel gear 38 is splined onto the end 88 of the end section 20 of the driving shaft 24 between the bearing 70 and a snap ring 90 secured to the end section 20 of the driving shaft 14. Bearing 70 is limited in movement outward of the housing 60 by means of the snap ring 92 carried thereby.

Driven shaft 10 is provided with an enlarged diameter outer end portion 94 and a reduced diameter inner end portion 96. The driven shaft 94 extends through the bearing 72 and is rotatably supported thereby. The reduced diameter end portion 96 of the driven shaft 94 is abutted against the bearing 78. Bevel gear 42 is abutted against the annular abutment 98 provided between the large and small diameter end portions of the driven shaft 10 and is held in this position by the snap ring 100 secured to the small diameter end portion 96 of the driven shaft 10.

In assembly the end section 20 of the driving shaft 14 is passed through the bearing 70. The bevel gear 38 is positioned thereon for rotation therewith in accordance with the mating splines provided on the end portion 88 of the end section 20 of the driving shaft 14 and is held in position by the snap ring 90. The bearing 70 is then inserted in the opening 62 in the housing 60 until the snap ring 92 abuts the housing 60.

The bearing 78 is then placed in recess 74, the driven shaft 10 is passed through the bearing 72 and the bearing 72 is positioned in the opening 64. The bevel gear 42 is sleeved over the small diameter end 96 of the driven shaft 10 and is abutted against the annular abutment 98 in a fixed relative rotational position with respect to the shaft 10 due to the spline connection therebetween and is held in position by the snap ring 100.

The shaft 10, bevel gear 42 and bearing 72 are positioned in the housing 60 so that the end of the shaft 10 adjacent recess 74 engages the bearing 78 and the bevel gears 38 and 42 are in mesh. The housing 60 is then secured to the frame 82 to hold the bearing 72 in position and the side 84 of the housing 60 is put in place to complete the assembly.

It will now be readily apparent that the structure 16 is extremely simple, is particularly easy to assemble and will be efficient in transferring rotary motion between the driving shaft 24 and the driven shaft 10. Similarly the structure 18 will provide rotational motion of the driven shaft 12 synchronized with the rotational motion of the driven shaft 10 on rotation of the driving shaft 24.

While one embodiment of the present invention has been considered in detail it will be understood that other embodiments and modifications of the invention disclosed are contemplated. It is the intention to include all such embodiments and modifications as are defined by the appended claims within the scope of the invention.

What I claim as my invention is:

1. In a power lawnmower the combination of a supporting frame, a pair of journal supports mounted in coaxial spaced relation on said frame, a pair of spaced rotatable stub shafts one journalled in each of said journal supports spaced from said frame and a drive train for imparting rotation to said stubshafts, said drive train comprising a drive shaft extending between and having terminal ends disposed one adjacent each of said stub shafts, an endless flexible element having a loop thereof trained around said drive shaft for rotating the same, one run of said loop thus being confined in the space defined between said driving shaft, journal supports and said frame, and means at each terminal end of said drive shaft releasably connecting the terminal ends of said drive shaft to said stub shafts and adapted to transmit torque between said shafts for rotating said stub shafts in response to rotation of said drive shaft, said releasable connecting means including at one of said ends of said drive shaft a connector axially overlapping and slidable axially of the adjacent ends of one of said stub shafts and said drive shaft to uncouple said adjacent ends whereby upon disconnectably releasing said releasable connecting means said drive shaft is bodily movable laterally relative to said stub shafts so that said loop of said flexible element may be removed sideways off of said driving shaft.

2. In a power lawnmower the combination comprising a frame, a pair of angle drive units mounted on said frame spaced from one another, each of said drive units having a rotary output shaft extending therefrom and a stub shaft rotatably coupled via the drive unit to the associated output shaft and having one end thereof extending from the drive unit coaxially towards the stub shaft of the other drive unit and spaced from said frame, a driving shaft likewise spaced from said frame extending coaxially between and having opposite ends thereof disposed one adjacent each of said one ends of said stub shafts, an annular member fixed to said driving shaft for rotation therewith, an endless flexible driving element having a loop thereof trained around said annular member on said driving shaft for rotating said driving shaft, one run of said loop thus being confined in the space defined between said driving shaft, frame and angle drive units, and first and second connectors individually axially overlapping and rotatably coupling the ends of said driving shaft to the respectively adjacent ends of said stub shafts, each of said connectors being telescopically engaged with its associated mutually adjacent ends of said driving and stub shafts and being axially movable relative to said associated shaft ends out of engagement with one of said associated ends to uncouple said driving shaft from said stub shafts such that said driving shaft may be moved laterally bodily clear of said stub shafts so that said loop of said endless flexible element may be removed from said annular member and moved sideways off of said driving shaft.

3. In a power lawnmower the combination comprising a frame, a pair of angle drive units mounted on said frame spaced from one another, each of said drive units having a rotary output shaft extending therefrom and a stub shaft rotatably coupled via the drive unit to the associated output shaft and extending from the drive unit coaxially towards the stub shaft of the other drive unit and spaced from said frame, a driving shaft likewise spaced from said frame extending coaxially between and having terminal ends disposed closely adjacent said stub shafts, an endless flexible driving element having a loop thereof trained around said driving shaft for rotating said driving shaft, one run of said loop thus being confined in the space defined between said driving shaft, frame and angle drive units, first and second internally splined sleeves one for coupling each terminal end of said shaft to the adjacent stub shaft, the mutually adjacent ends of said driving and stub shafts having external splines interengaged with said sleeve splines, each of said sleeves being carried on said driving shaft and telescopically engaging the adjacent stub shaft and being axially movable out of engagement therewith to uncouple said driving shaft from said stub shafts, and means releasably interengaging said sleeves and said driving shaft to lock said sleeve against axial movement on said driving shaft.

4. In a power lawnmower, the combination of a pair of substantially parallel driven shafts and a drive train for rotating said driven shafts in synchronism, said drive train comprising a three-piece driving shaft extending transversely of and substantially perpendicularly to said driven shafts, said drive shaft consisting of a center section and a pair of separate end sections, an endless flexible driving element having a loop thereof trained around said center section of said driving shaft for rotating the same, a pair of connectors slidably carried one on each end of said center section of said driving shaft for releasably coupling each of said end sections to said center section for rotation therewith, and a pair of right angle drive units mounted in fixed spaced positions on the lawnmower one between each end section of said driving shaft and the adjacent driven shaft for operably connecting the driven shaft in rotary driven relation with the driving shaft, each of said drive units comprising a substantially rectangular housing fixed to the lawnmower and having an opening in each of two adjacent sides thereof and an internal recess in a side thereof opposite one of said openings, a thrust bearing positioned in said recess receiving the end of the associated driven shaft, a first annular bearing positioned within said one opening rotatably receiving said associated driven shaft, a first bevel gear secured to said associated driven shaft for rotation therewith, a second annular bearing positioned in the other of said openings rotatably receiving the associated end section of the driving shaft, a second bevel gear secured to said associated end section of said driving shaft within the housing and engaged with said first bevel gear, a first snap ring secured to said second bearing for preventing movement of said second bearing through said other opening out of the housing and a second snap ring secured to said associated end section of the driving shaft for locking said second bevel gear between said second bearing and said second snap ring, said end sections of said driving shaft thus being rotatably mounted in axially fixed positions in said housings and said center section of said driving shaft being bodily and laterally removable from between said end sections of said driving shaft by decoupling said connectors therefrom to thereby permit said loop of said flexible element to be removed sideways off of said center section of said driving shaft.

5. Structure as set forth in claim 4 wherein the driven shaft is provided with a large diameter portion extending through the first bearing and a small diameter portion received within the housing forming an annular abutment therebetween and including a third snap ring provided on the small diameter portion of the driven shaft to secure said first bevel gear to the shaft between the third snap ring and annular abutment against movement axially of the shaft.

References Cited by the Examiner

UNITED STATES PATENTS

| | | | |
|---|---|---|---|
| 1,053,569 | 2/1913 | Cadman | 74—12 |
| 2,505,952 | 5/1950 | Fergason | 56—25.4 |
| 2,519,749 | 8/1950 | Edwards | 56—25.4 |
| 2,521,417 | 9/1950 | Sefcovic | 56—25.4 |
| 2,601,366 | 6/1952 | Chapman | 56—25.4 |
| 2,774,590 | 12/1956 | Blanchard | 287—2 |
| 3,081,645 | 3/1963 | Bergfors | 74—594.1 |

FOREIGN PATENTS 1,051,226 2/1959 Germany.

DON A. WAITE, *Primary Examiner.*

BROUGHTON G. DURHAM, *Examiner.*